US006206149B1

(12) United States Patent
Heidenreich et al.

(10) Patent No.: US 6,206,149 B1

(45) Date of Patent: Mar. 27, 2001

(54) CALIPER DISK BRAKE FOR STEEL MILL CRANES

(75) Inventors: David C. Heidenreich; Michael O. Culbertson, both of Akron, OH (US)

(73) Assignee: Power Transmission Technology, Inc., Sharon Center, OH (US)

( * ) Notice: Subject to any disclaimer, the term of this patent is extended or adjusted under 35 U.S.C. 154(b) by 0 days.

(21) Appl. No.: 09/398,561

(22) Filed: Sep. 17, 1999

Related U.S. Application Data

(63) Continuation-in-part of application No. 08/789,408, filed on Jan. 29, 1997, now Pat. No. 5,957,248.

(51) Int. Cl.[7] ..... B60T 13/04

(52) U.S. Cl. ..... 188/171; 188/1.11 W; 188/71.7

(58) Field of Search ..... 188/171, 173, 188/72.3, 161, 163, 71.7, 196 M, 196 V, 1.11 R, 1.11 W, 181 T; 303/71, 72, 74; 335/248, 271, 277; 310/77, 51, 93, 103; 192/84.1, 84.5, 84.81

(56) References Cited

U.S. PATENT DOCUMENTS 1,317,798 * 10/1919 Larson .
3,357,528 * 12/1967 Verlinda ..... 188/171
3,682,279 * 8/1972 Palme et al. ..... 188/171
4,049,089 * 9/1977 Rundle ..... 188/171
5,014,828 * 5/1991 Baldassarre ..... 188/173
5,253,738 * 10/1993 Vertesy et al. ..... 188/171
5,518,087 * 5/1996 Hwang et al. ..... 188/171
5,582,277 * 12/1996 Heidenreich et al. ..... 188/171
5,685,398 * 11/1997 Marshall et al. ..... 188/171
5,739,610 * 4/1998 Nemoto et al. ..... 310/77
5,957,248 * 9/1999 Heidenreich ..... 188/171

* cited by examiner

*Primary Examiner*—Douglas C. Butler

(74) *Attorney, Agent, or Firm*—Renner, Kenner, Greive, Bobak, Taylor & Weber

(57) ABSTRACT

A caliper disk brake includes a brake disk having at least one set of brake pads disposed on opposite sides thereof and connected to a pair of caliper arms. The caliper arm are interconnected with a magnetic actuator consisting of an armature slidingly received by a magnet body. A spring interposed between the armature and magnet body actuates the brake, while an electromagnetic coil releases it. A sealed cavity is provided between the armature and magnet body with a metered and valved vent in communication with the cavity to allow for controlled brake application and instantaneous release. A wear adjustment bolt received a trunion connected to one of the caliper arms and has an end thereof received within a bore of the magnet body maintaining the spring. Coaxially aligned with the wear adjustment bolt a torque adjustment bolt which secures a second trunion receiving the other caliper arm. The torque adjustment bolt communicates with the spring and, in combination with adjustment washers, allows for the presetting of a characteristic brake torque and a visual indication thereof. The magnetic actuator of the caliper disk brake assembly is mounted by bolts received within bushings which may consist of either a steel sleeve received within an elastomeric sleeve, or a steel sleeve received within a bronze sleeve.

20 Claims, 3 Drawing Sheets

46 24 44 86 80 48 54 52 50 26 66 26 58 79 82 84 74 64 78 76 62 60 70 88 48 72 68 29 42 28 40 44 91 90 46

24
26
28
29
40
42
44
46
48
50
52
54
58
60
62
64
66
68
70
72
74
76
78
79
80
82
84
86
88
90
91

CALIPER DISK BRAKE FOR STEEL MILL CRANES

CROSS REFERENCE

This application is a continuation-in-part of application Ser. No. 08/789,408, filed Jan. 29, 1997, U.S. Pat. No. 5,957,248, which is fully incorporated herein by reference.

TECHNICAL FIELD

The invention herein resides in the art of power transmission devices such as clutches and brakes. More particularly, the invention relates to a brake for employment with steel mill cranes. Specifically, the invention relates to a caliper disk brake for steel mill cranes which is readily adapted for replacing drum brakes and improving caliper brakes employed for the same purpose

BACKGROUND ART

In parent application Ser. No. 08/789,408, U.S. Pat. No. 5,957,248, the background of the art for brakes used in association with steel mill cranes was set forth in detail. In that application, adopted fully herein by reference, there was presented in detail a caliper disk brake assembly adapted for substitution of the prior art drum-shoe brake predominantly used for crane hoist drives. It has been found that even though the caliper disk brake of the parent application provided a significant advance over the prior art drum-shoe brakes, a number of improvements can be made to the caliper disk brakes to even further enhance their operation.

It has been found that dust and other contamination may enter the magnetic armature of the prior caliper disk brake and impede full release of the brake, necessitating routine servicing or cleaning of the brake assembly. Moreover, the prior caliper disk brake has provided no visible indication of torque setting, allowing for the possibility that a brake of improper torque may be placed in an application.

It has further been found that the large mass of spring applied armature plates may cause an undesired torque spike upon brake engagement. Such a shock load may contribute to over-stressing of the shaft upon which the brake disk is mounted. Additionally, the existent caliper disk brakes have generally been quite costly to manufacture.

It has further been found that when a caliper disk brake is used on a crane travel drive, it is most desirable to have the brake applied slowly so that the load on the hoist does not swing exceptionally.

It has also been found to be quite important in the design of caliper disk brakes of the type herein that wear adjustment be easily achieved in the field.

It has further important that there be an easy way to monitor the brake wear in the field.

Yet further, it has been found that the life of the coil within the magnet body of a caliper disk brake may be adversely impacted by shock loads experienced when the crane travels over old uneven rails. Accordingly, there is a need to provide for shock absorption in the traveling mechanism.

It has further been found to be desirable to provide for multi-brake calipers on brake assemblies such that the braking operation can be imparted to the disk at uniformly spaced or diametrically opposed positions thereon.

DISCLOSURE OF INVENTION

In light of the foregoing, it is a first aspect of the invention to provide a caliper disk brake in which the armature is substantially sealed from dust and contamination.

Another aspect of the invention is the provision of a caliper disk brake in which there is a visual indication of the torque setting thereof.

Still a further aspect of the invention is the provision of a vacuum cushioned armature which substantially precludes the likelihood of torque spikes resulting from a shock load when the brakes are applied.

Still a further aspect of the invention is the provision of a caliper disk brake which allows the brakes to be applied slowly.

Still a further aspect of the invention is the provision of a caliper disk brake which is made of a cylindrical shape to maintain manufacturing efficiency, while employing an anti-rotation pin combined with an armature gap indicator to not only maintain armature registration, but allow ease of brake adjustment.

Yet an additional aspect of the invention is the provision of a caliper disk brake in which elastomeric bushings are employed to cushion the magnet assembly from travel forces.

Still a further aspect of the invention is the provision of a caliper disk brake in which at least a pair of calipers are diametrically opposed across the brake disk, improving brake force, while allowing for interchangeability between the calipers themselves.

The foregoing and other aspects of the invention which will become apparent as the detailed description proceeds are achieved by a caliper disk brake, comprising: a disk adapted for connection to a rotatable shaft; a pair of caliper arms, each having a brake pad at a first end thereof, said brake pads being maintained on opposite sides of said disk; and a magnetic actuator interposed between and connected to second ends of said caliper arms, said magnetic actuator comprising: an armature connected to a first end of said caliper arms; a magnet body maintaining an electromagnetic coil and connected to a second end of said caliper arms; and a spring interposed between and urging said armature and magnet body apart and thereby urging said brake pads into engagement with said disk.

Other aspect of the invention that will become apparent herein are achieved by a caliper disk brake, comprising: a disk adapted for connection to a rotatable shaft; a pair of brake pads maintained on opposite sides of said disk; and a magnetic actuator in operative connection with said brake pads, said magnetic actuator comprising: an armature; a magnet body in juxtaposition to said armature and maintaining an electromagnetic coil; a spring interposed between and urging said armature and magnet body apart and thereby urging said brake pads into engagement with said disk; and a pair of ring seals defining a sealed annular cavity between said armature and said magnet body, and further comprising a metered orifice communicating between ambient and said sealed cavity, said metered orifice controlling a rate of separation of said armature from said magnet body by controlled release of a vacuum therein during such separation.

DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
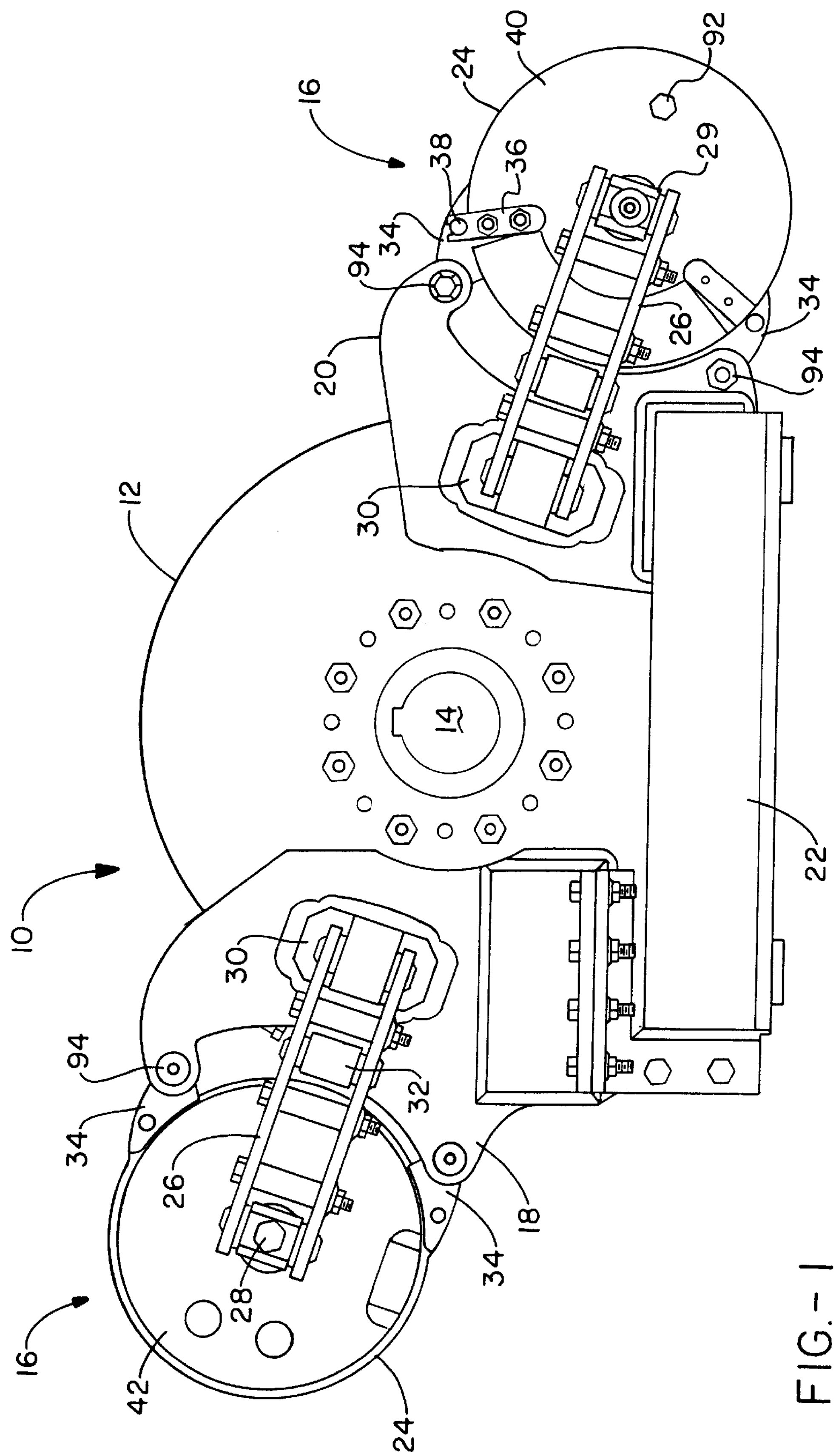
FIG. 1 is a front elevational view of the caliper disk brake assembly made in accordance with the invention.

Referring now to the drawings and more particularly FIG. 1, it can be seen that a caliper disk brake made in accordance with the invention is designated generally by the numeral 10. It will be appreciated that the disk brake assembly 10 is particularly adapted for implementation with the hoists of steel mill cranes, but may be adapted for any of a number of other uses. The disk brake assembly 10 includes a brake disk 12 secured by appropriate means, such as keying or the like, to a rotatable shaft 14. A pair of caliper assemblies 16 are provided in association with the brake disk 12. While it is only required that a single caliper assembly 16 be employed, it is contemplated that more than one may be used. In the specific embodiment shown, two of such caliper assemblies 16 are employed in diametric opposition with respect to the brake disk 12. The caliper assemblies 16 are secured by means of support arm pairs 18, 20 to a base assembly 22, as shown. It will be appreciated that each of the support arms 18, 20 comprise a pair of plates, one on each side of the brake disk 12, for the appropriate mounting function.

Each of the caliper assemblies 16 includes a magnetic actuator 24, shown in detail in FIG. 2 and discussed in detail later herein. A pair of caliper arms 26 is connected on opposite sides of each of magnetic actuators 24, as shown. It will be appreciated that the arms 26 are connected as by trunions 28, 29 to the magnetic actuators 24 at one end thereof and to appropriate friction pads 30 at an opposite end thereof. The caliper arms 26 are paired together by means of cross link members 32 interposed therebetween, the cross link members allowing the caliper arms 26 to pivot thereabout. As will be readily appreciated by those skilled in the art, as magnetic actuator 24 opens or expands, the caliper arms 26 pivot about the associated cross link members 32 to bring the friction pads 30 toward each other and into engagement with the brake disk 12 to effect braking action. In like manner, when the electromagnet of magnetic actuator 24 is actuated, causing the actuator 24 to constrict, the caliper arms 26 rotate about the cross link members 32 to draw the friction pads 30 away from each other, thereby terminating the braking activity.

Flanges 34 extend from the magnetic actuator 24 and are bolted to the support arms 20 by elastomeric support structures 94 to be discussed later herein.

A bracket 36 is mounted to each of the magnetic actuators 24 and receives a combination anti-rotation and gap indicator pin 38. The pin 38 is axially moveable within the bracket 36, but is secured at an end thereof to flange 34, which in turn is connected to the magnet body of magnetic actuator 24. As will become apparent later herein, with the pin 38 being effectively connected to the magnet body of the actuator 24, and bracket 36 being connected to the armature of the actuator, the pin 38 acts as an anti-rotation pin between the two portions of the actuator 24. Moreover, with the pin 38 being axially slidably received by the bracket 36, the pin 38 serves as a wear indicator respecting the friction wear pads 30.

Figure 2:
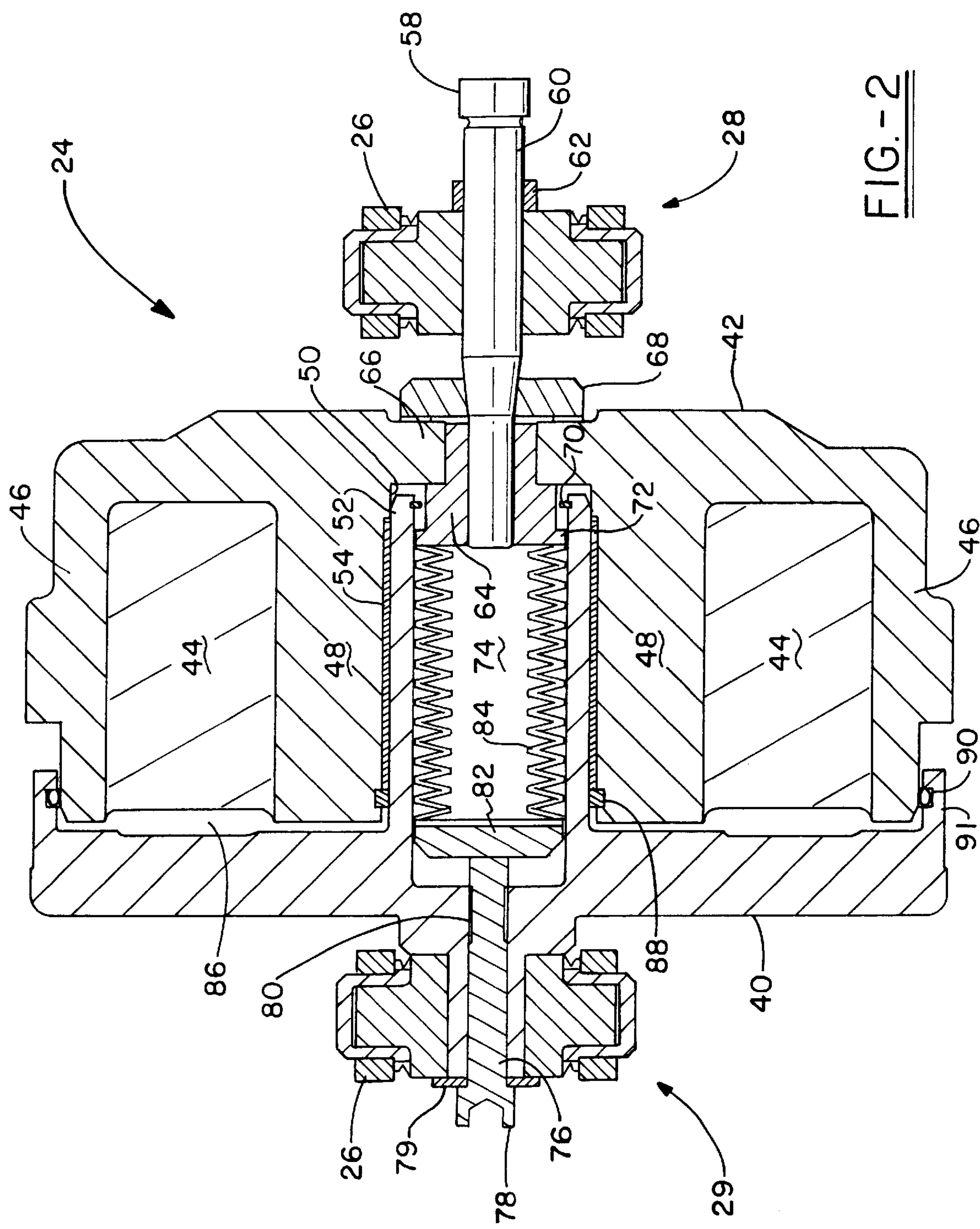
FIG. 2 is a cross sectional view of the magnetic actuator of the invention.

Referring now to FIG. 2, an appreciation can be obtained respecting the structure of the magnetic actuators 24 of the instant invention. As shown, each of the actuators 24 includes an armature 40 and a magnet body 42. The magnet body 42 receives and maintains an electromagnetic coil 44 and defines therebetween an outer magnetic pole 46 and an inner magnetic pole 48, each being cylindrical in nature. The magnet body 42 includes an axial bore 50 which receives an axial cylindrical extension 52 of the armature 40. An armature sleeve bearing 54 is interposed between the bore 50 and cylindrical extension 52, allowing for axial movement of the armature 40 with respect to the magnet body 42.

As further shown in FIGS. 1 and 2, a pair of trunions 28, 29 secures the pair of caliper arms 26 to opposite sides of the electromagnetic actuator 24, as shown. The trunion 28 associated with the magnet body 42 receives a wear adjustment bolt 60 threaded therethrough. A jam nut 62 locks the trunion 28 on the wear adjustment bolt 60, as shown. The bolt 60 is preferably tapered, as shown, and has a collar 64 at an end thereof and received within the axial bore 50 of the magnet body 42 and seated on the flange 66 thereof. A thrust washer 68 securedly engages the bolt 60 to the magnet body 42, as shown. Accordingly, and as will be appreciated by those skilled in the art, the trunion 28 secured to the bolt 60 is movable with the magnet body 42 of the electromagnetic actuator 24.

A retaining ring 70 is received within the inner circumferential surface of the cylindrical extension 52 to engage the circumferential flange 72 of the collar 64 to retain the collar 64 within the cup 74 of the cylindrical extension 52.

With further reference to FIG. 2, it can be seen that the trunion 29 receiving the other of the pair of caliper arms 26 is fixed to the armature 40 of the magnetic actuator 24. A torque adjustment bolt 76 having a bolt head 78 thereon is threadedly secured as at 80 to the armature 40. An adjustment washer 79 is interposed beneath the head 78 and armature 40, as shown. A plate 82 is maintained at the end of the torque adjustment bolt 76 and within the bore 50 as illustrated and is driven by the bolt 76 when the bolt 76 is engaged by an appropriate wrench or other tool for purposes of spring force and torque adjustment.

It should now be appreciated that a trunion 29 and associated caliper arm 26 is secured to the armature 40, while an opposite trunion 28 and associated caliper arm 26 is fixed to the magnet body 42. Relative movement between the armature 40 and magnet body 42 of the magnetic actuator 24 thus effects actuation and release of the brake by movement of the caliper arms about their interconnecting cross link member 32 and resulting engagement and disengagement of the friction pads 30 with the brake disk 12. Actuation of the brake is achieved by means of the spring 84 maintained within the cup 74 defined by the axial cylindrical extension 52. The spring 84 is compressed between the plate 82 set by the torque adjustment bolt 76 and the collar 64 connected to the wear adjustment bolt 60. The spring 84 serves to normally urge the head 82 and collar 64 apart, actuating the brake by bringing the friction pads 30 into contacting engagement with the disk 12. In other words, this action serves to drive the armature 40 away from the magnet body 42 for brake actuation. When the electromagnetic coil 44 is energized, the resulting magnetization of the poles 46, 48 causes the armature 40 to be drawn toward the magnet body 42, further compressing the spring 84 and causing the friction pads 30 to be released from the disk 12.

Figure 3:
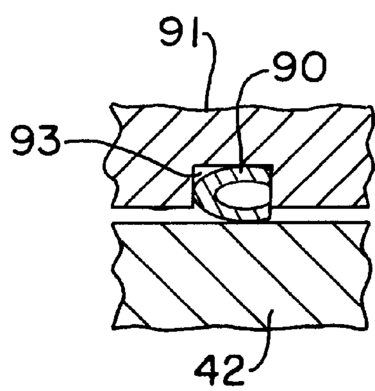
FIG. 3 is a partial cross sectional view of a sealing ring employed in accordance with the invention, showing the same disposed between the armature and base of the magnetic actuator.

Those skilled in the art will appreciate that an annular cavity 86 is defined between the armature 40 and the magnet body 42 of the electromagnetic actuator 24. According to the preferred embodiment of the invention, the annular gap 86 is sealed by means of an inner ring seal 88 interposed between the inner magnetic pole 48 and cylindrical extension 52 of the armature 40, with an outer ring seal 90 being interposed between the outer magnetic pole 46 of the magnet body 42 and the ring flange 91 of the armature 40. The ring seals 88, 90 are substantially identical in nature, with the representative ring seal 90 being shown in illustration in FIG. 3. As shown, each of the ring seals 88, 90 is "C" shaped in cross section and received within a groove provided in one of the opposing members while protruding therefrom to engage the other. As shown in FIG. 3, a groove 93 is provided within the flange 91 of the armature 40 and wipingly seals against the opposed outer surface of magnet body 42. In like manner, the seal 88 would be received within a notch or groove of the magnet body 42 and sealingly wipe against the axial cylindrical extension 52 of the armature 40.

Figure 4:
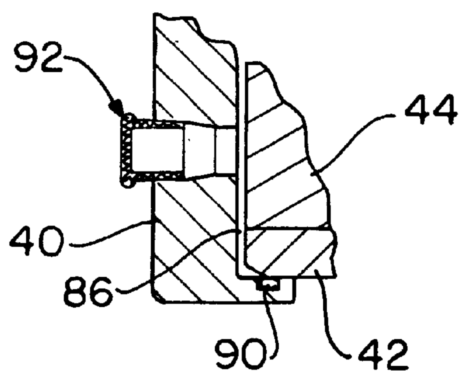
FIG. 4 is a cross sectional view of a part of the magnetic actuator of the invention, showing the filtered vent thereof which allows for the slow actuation and quick release of the caliper brake assembly.

The resulting annular cavity 86 is substantially air tight, such that, absent an appropriate vent or the like, movement of the armature 42 would be opposed by an effective vacuum and/or pressurized sealed cavity. While it is desired that the brake be applied slowly, it is also desired that it be released quickly. Accordingly, a filtered vent 92, shown in FIG. 1 and in enlarged view in FIG. 4, is provided in communication through the armature 40 and with the cavity 86. The filtered vent 92 has an orifice of adjustable diameter such that the size of the orifice can be set to meter the air flow into the cavity 86 against the vacuum therein maintained by the seals 88, 90. Accordingly, when the electromagnetic coil 44 is de-energized, the spring 84 which seeks to otherwise instantaneously apply the brake, is delayed by the vacuum within the cavity 86, which vacuum is slowly extinguished by the metered entry of air into the cavity 86 through the filtered vent 92. Of course, the vent 92 is tailored to the specific rate of brake application desired for any particular employment.

While it is often desired to retard the rate of brake application, the rate of brake release is generally desired to be instantaneous. Accordingly, the filtered vent 92 may include an exhaust check valve, allowing the air within the cavity 86 to be vented instantaneously when actuation of the coil 44 draws the armature 40 to the magnet body 40. With the exhaust valve being a check valve, no air may enter therethrough on the application stroke, described above. Of course, it will be appreciated that the exhaust check valve may either be a part of the filtered vent 92, or it may be a separate valve in parallel with the filtered vent 92. Additionally, it is contemplated that in dusty or dirty environments, an air bladder may be employed in communication with the filter vent 92 for exchange of air with the cavity 86.

Figure 5:
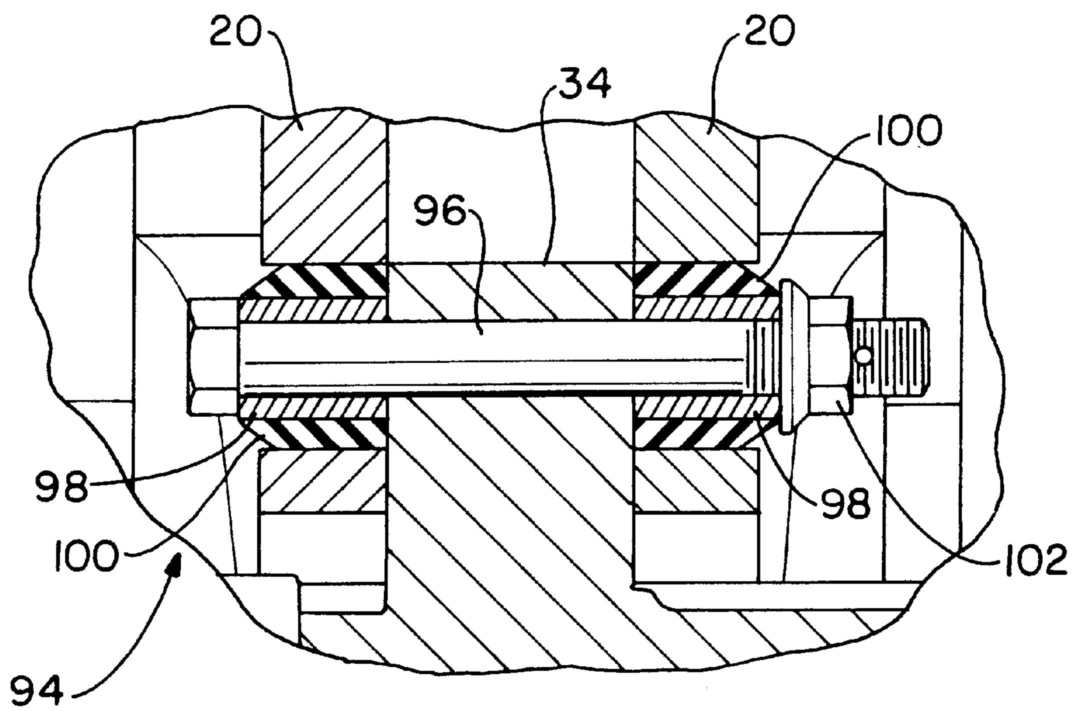
FIG. 5 is a partial cross sectional view of the elastomeric support structure employed for mounting the magnetic actuator to the base of the caliper disk brake assembly.

As mentioned with respect to FIG. 1, elastomeric support structures 94 are employed in association with the preferred embodiment of the invention to secure the flanges 34 of magnetic actuator 24 to the pairs of support arms 18, 20 and hence to the base 22. To prevent damage to the actuator 24 resulting from transport along uneven rails and the like, the mounting of the magnetic clutch assembly 24 is preferably undertaken with an elastomeric securement. As shown in FIG. 5, the flange 34 has a bore therethrough which is in alignment with corresponding bores in associated support arms 20. A bolt 96 passes through these bores to perform a substantially standard securing function. However, to provide shock dampening, the bores in the support arms 20 each receive a steel sleeve or bushing 98 which, in turn, is received by an elastomeric sleeve or bushing 100. The bolt 96 passes through the steel sleeves, as shown, and is secured by an appropriate nut 102 at the threaded end thereof. With each magnetic actuator assembly 24 being mounted at each mounting point to the support arms 20 by means of the elastomeric support structures 94 just described, the magnetic actuators 24 are substantially isolated from the vibrations and shocks otherwise imparted thereto during travel along crane tracks, and the like.

The invention further contemplates that the support structure 94 may be slightly modified for certain applications, and particularly where the support is to allow for slight rotation. For example, the bushing 100 may be a bronze sleeve, rather than elastomeric, for such purposes.

With reference again to FIGS. 1 and 2, the adjustment technique for compensating for wear in the brake assemblies 10 can be appreciated. Those skilled in the art will understand that as the friction pads 30 wear, the gap between the poles 46, 48 and armature 40 will extend and the combination anti-rotation and gap indicator pin 38 will be drawn into its receiving bracket 36. At the same time, the built-in clearance between the pads 30 and the brake disk 12 will increase. To return the built-in clearance and gap to their desired dimensions, wear adjustment bolt 60 may be rotated as by its bolt head 58 until such time as the pin 38 indicates that the desired dimensions have been achieved. Typically this will be when the pin 38 is flush with the bracket 36. The adjustment simply requires release of the jam nut 62, rotation of the bolt 60 until the pin 38 is flush with the bracket 36, and retightening of the jam nut 62. Such adjustments may continue until the jam nut 62 locks against the hex head 58, at which time the friction pads 30 must be replaced.

Setting of the characteristic brake torque may be similarly attained with the torque adjustment bolt 76. Its threaded engagement with the armature 40 allows for positioning of the plate 82 and, hence, loading of the spring 84, with that loading and associated torque then being visually apparent by the number and/or size of adjustment washers 79. This torque, typically set at the time of manufacture, may be adjusted or reset as desired. It will further be appreciated that while the seals 88, 90 serve to provide a controlled vacuum within the cavity 86, they further serve to prevent the entry of debris or other contaminates between the armature 40 and magnet body 42, thus extending the life of the magnetic actuator 24 beyond that otherwise expected. Moreover, it will be appreciated that when the structure of FIG. 1 is employed, with two diametrically opposed magnetic actuator assemblies 24, adverse bending loads on the shaft 14 may be avoided. With the magnetic actuator assemblies 24, caliper arms 26, and friction pads 30 being identical irrespective of the point of implementation in the brake assembly 10, the number of parts required for maintaining the brake are minimized, cost is reduced, and repair is simplified.

Thus it can be seen that the objects of the invention have been satisfied by the structure presented above. While in accordance with the patent statutes only the best mode and preferred embodiment of the invention has been presented and described in detail, it will be understood that the invention is not limited thereto or thereby. Accordingly, for an appreciation of the true scope and breadth of the invention reference should be made to the following claims.

What is claimed is:

1. A caliper disk brake, comprising:

a disk adapted for connection to a rotatable shaft;

a pair of caliper arms, each having a brake pad at a first end thereof, said brake pads being maintained on opposite sides of said disk; and a magnetic actuator interposed between and connected to second ends of said caliper arms, said magnetic actuator comprising:

an armature connected to a first end of said caliper arms;

a magnet body maintaining an electromagnetic coil and connected to a second end of said caliper arms;

a spring interposed between and urging said armature and magnet body apart and thereby urging said brake pads into engagement with said disk; and wherein said armature is sealingly received and movable within said magnet body.

2. The caliper disk brake according to claim 1, wherein said armature and magnet body are sealingly engaged by a ring seal interposed therebetween.

3. The caliper disk brake according to claim 2, wherein said ring seal is C-shaped in cross section and made of elastomeric material.

4. The caliper disk brake according to claim 2, wherein said ring seal defines a sealed cavity between said armature and said magnet body, and further comprising a metered orifice communicating between ambient and said sealed cavity, said metered orifice controlling a rate of separation of said armature from said magnet body.

5. The caliper disk brake according to claim 4, wherein said metered orifice further comprises a check valve to ambient from said cavity, allowing substantially instantaneous rate of closure of said armature upon said magnet body.

6. The caliper disk brake according to claim 1, wherein said armature and magnet body are slidingly matingly engaged by a cylindrical extension received within a bore having a sleeve bearing interposed therebetween.

7. The caliper disk brake according to claim 6, wherein said spring is axially received and aligned within said cylindrical extension.

8. The caliper disk brake according to claim 7, further comprising a wear adjustment bolt coaxial with said spring and having an end received within said bore.

9. The caliper disk brake according to claim 8, further comprising a thrust washer upon said wear adjustment bolt, said thrust washer being in secured contacting engagement with one of said magnet body and armature.

10. The caliper disk brake according to claim 9, further comprising a first trunion threadedly received upon said wear adjustment bolt, said first trunion being secured to said first end of a first of said caliper arms.

11. The caliper disk brake according to claim 7, further comprising a torque adjustment bolt coaxial with said spring and having an end received within said bore.

12. The caliper disk brake according to claim 11, further comprising a plate interposed between a first end of said torque adjustment bolt and said spring within said bore.

13. The caliper disk brake according to claim 12, further comprising a second trunion secured by said torque adjustment bolt and secured to said first end of a second of said caliper arms.

14. The caliper disk brake according to claim 13, wherein said torque adjustment bolt is threadedly secured to one of said magnet body and armature.

15. The caliper disk brake according to claim 14, further comprising at least one washer interposed between a head of said torque adjustment bolt and said second trunion, said washer providing a visual indication of a characteristic brake torque of the caliper disk brake.

16. The caliper disk brake according to claim 1, further comprising a pin interconnected between said armature and said magnet body, said pin precluding relative rotation between said armature and said magnet body.

17. The caliper disk brake according to claim 16, wherein said pin is fixedly attached to one of said armature and magnet body, and slidingly movable with respect to the other, said pin serving as a wear indicator of said brake pads.

18. The caliper disk brake according to claim 1, wherein said magnetic actuator is mounted to a base by at least two mounting bolt assemblies, at least one of which comprises a bolt passing through a rigid bushing received within an elastomeric bushing.

19. The caliper disk brake according to claim 18, wherein at least one of said mounting bolt assemblies comprises a rigid bushing received within a bronze bushing, and a bolt passing through said rigid bushing.

20. A caliper disk brake, comprising:

a disk adapted for connection to a rotatable shaft;

a pair of brake pads maintained on opposite sides of said disk; and a magnetic actuator in operative connection with said brake pads, said magnetic actuator comprising:

an armature;

a magnet body in juxtaposition to said armature and maintaining an electromagnetic coil;

a spring interposed between and urging said armature and magnet body apart and thereby urging said brake pads into engagement with said disk; and a pair of ring seals defining a sealed annular cavity between said armature and said magnet body, and further comprising a metered orifice communicating between ambient and said sealed cavity, said metered orifice controlling a rate of separation of said armature from said magnet body by controlled release of a vacuum therein during such separation.

* * * * *